No. 684,630. Patented Oct. 15, 1901.
E. B. CORE & L. GRUBMAN.
PHOTOGRAPHIC APPARATUS.
(Application filed June 21, 1900.)

(No Model.) 2 Sheets—Sheet 1.

WITNESSES:
John O. Gempler
Edwin Segel

INVENTORS
E. B. Core
Leo Grubman
BY
Kenyon & Kenyon
ATTORNEYS

No. 684,630. Patented Oct. 15, 1901.
E. B. CORE & L. GRUBMAN.
PHOTOGRAPHIC APPARATUS.
(Application filed June 21, 1900.)
(No Model.) 2 Sheets—Sheet 2.
Fig. 4,
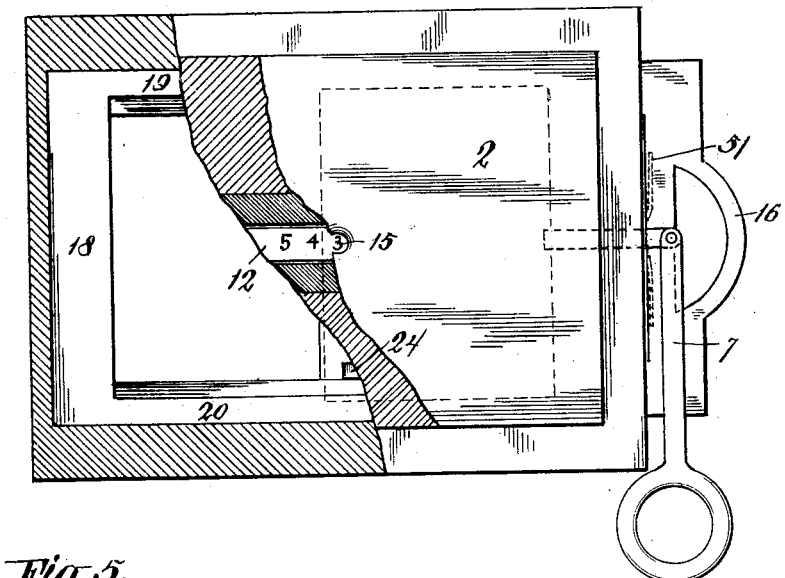
Fig. 5,
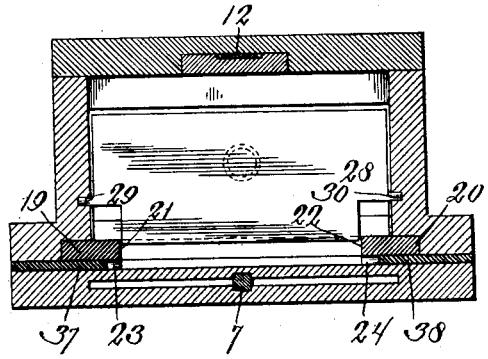
Fig. 6,
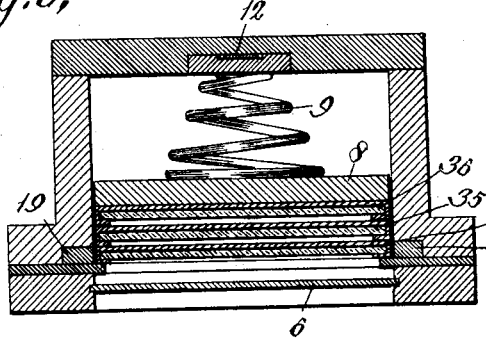
WITNESSES:
John O. Gempler
Edwin Segre
INVENTORS
E. B. Core
Leo Grubman
BY
Kenyon & Kenyon
ATTORNEYS

UNITED STATES PATENT OFFICE.

ELIJAH B. CORE AND LEO GRUBMAN, OF NEW YORK, N. Y.; SAID GRUBMAN ASSIGNOR OF ONE-HALF HIS RIGHT TO SAID CORE.

PHOTOGRAPHIC APPARATUS.

SPECIFICATION forming part of Letters Patent No. 684,630, dated October 15, 1901.

Application filed June 21, 1900. Serial No. 21,076. (No model.)

*To all whom it may concern:*

Be it known that we, ELIJAH B. CORE, a citizen of the United States, and LEO GRUBMAN, a subject of the Czar of Russia, both residents of the city, county, and State of New York, have invented a new and useful Improvement in Photographic Apparatus, of which the following is a specification.

This invention relates to photographic apparatus. More particularly, the invention relates to a magazine plate-holder adapted to be secured in position on the camera and adapted to hold a plurality of plates or a stack of plates and so constructed and arranged that when a plate in the holder has been exposed it may be quickly moved out of operating position and a fresh or unexposed plate substituted therefor. By this arrangement the operator is able to make a number of exposures in rapid succession with the least expenditure of time and effort in substituting an unexposed for an exposed plate.

The invention consists of the features hereinafter set forth.

Figure 1:
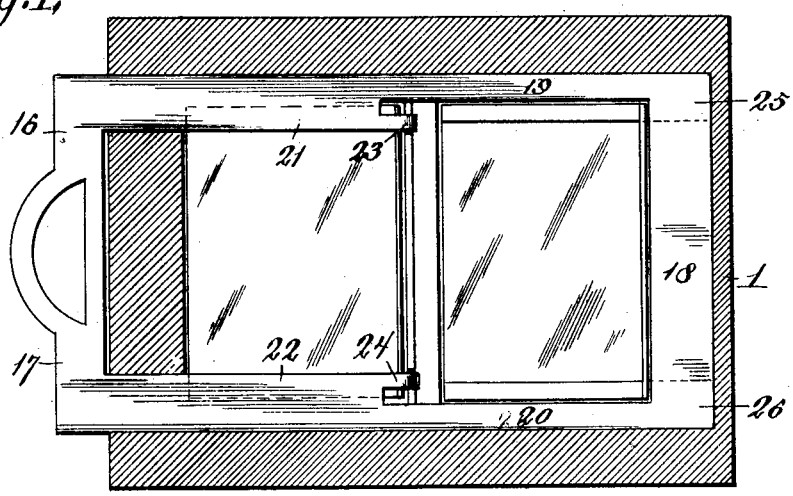
Figure 2:
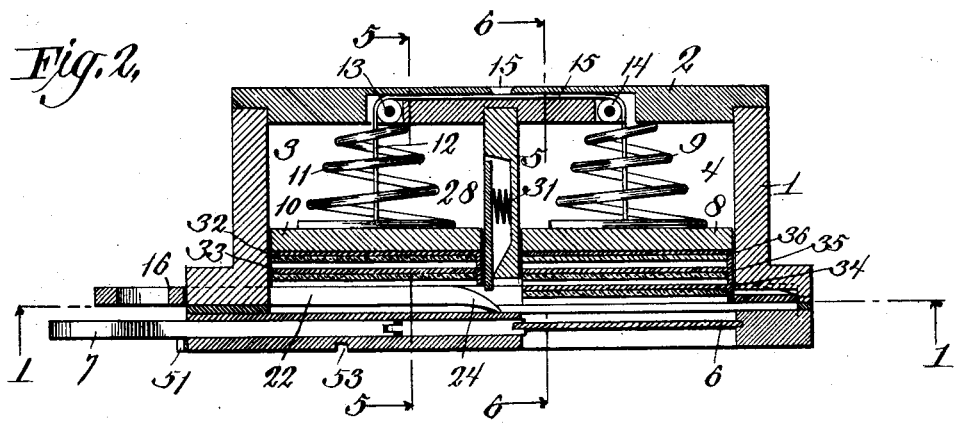
Figure 3:
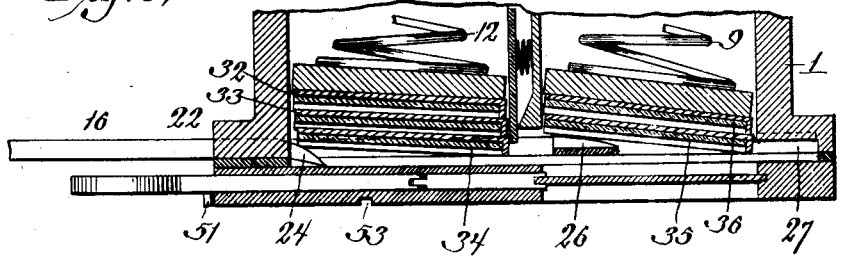

In the accompanying drawings, which show one embodiment of the invention, Figure 1 is a sectional inverted plan view of the plate-holder on the line 1 1 of Fig. 2. Fig. 2 is a central vertical section of the plate-holder.
Fig. 3 is a similar view to Fig. 2, with the top of the plate-holder omitted and showing the parts in the positions which they occupy during the operation of shifting a plate. Fig. 4 is a plan view of the holder with parts broken away and in section. Figs. 5 and 6 are vertical sections on the lines 5 5 and 6 6, respectively, of Fig. 2.

Referring now to the particular construction of the plate-holder, 1 is a case with a removable back 2 and divided into the compartments 3 4 by a partition 5, which extends forward from the rear to within about the thickness of a plate from the front side of the case, and so as to leave a communicating opening between the compartments 3 4 on the front or operating side of the case. In the arrangement shown in the drawings a stack of unexposed plates is arranged in the compartment 4, and the front plate of the stack is exposed by drawing out the slide 6 by means of its handle 7. The exposed plate is thereafter shifted from the compartment 4 to the compartment 3. Since the plates are first put into or loaded in the compartment 4 and thence shifted into or received in the compartment 3, the compartment 4 may be termed the "loading-compartment," and the compartment 3 may be termed the "receiving-compartment."

The loading-compartment 4 is provided with a follower 8, pressed by a spring 9 against the rear of the stack of plates to keep the plates up in position and to feed them forward as the exposed plate in front is shifted into the receiving-compartment 3 from time to time. The compartment 3 is also provided with a follower 10, pressed forward by a spring 11. In order that the operator may be able to know at any time how many unexposed plates remain in the compartment 4, we provide a suitable indicator, which in the present instance consists of a tape or band 12 running over pulleys 13 14 and through a channel 15 in the back plate 2, the ends of the tape 12 being secured to the followers 8 and 10. Midway between the rolls 13 and 14 a sight-hole 15 is made, through which numerals on the tape 12 are visible. When the compartment 4 is filled to its capacity, containing, say, six plates, and the compartment 3 is empty, the number "6" would appear opposite the sight-hole 15. When the front plate is withdrawn from the compartment 4, the follower 8 would carry the tape forward so as to then expose the number "5" at the sight-hole 15. Thus as the number of plates decrease in the compartment 4 the numbers opposite the sight-holes 15 would diminish accordingly.

The plates are shifted by means of a frame, as 16. This frame is open at its middle and is adapted to slide back and forth on metal plates 37 and 38, secured on the front side and within the case 1. The frame is composed of two opposite end bars 17 and 18 and two opposite side bars 19 and 20. The side bars are provided with flanges 21 and 22, which terminate in shoes 23 and 24, respectively, which constitute a device for pushing back the plates, or what may be termed a "plate-pusher." The flanges 21 and 22 extend about half the length of the frame 16, so as not to enter the compartment 4 when the frame is pushed all the way in. The frame at its inner end is large enough to receive one of the plates, but it is not of sufficient width at the other end to receive a plate, on account of the flanges 21 and 22. The inner ends of the side rails 19 and 20 on their upper sides terminate in inclined portions or shoes 25 and 26, and a recess 27 is provided in the inner side wall of the case to receive the end rail 18.

In order to prevent the displacement of a plate on the return movement of the shifting-frame 16, we provide a suitable stop, which preferably consists of the plate 28, pivoted near its lower end by the trunnions 29 and 30 in the sides of the case. The partition 5 is provided with a recess adapted to receive the plate 28, a spring 31 being interposed between the partition 5 and the plate 28. The lower end of the plate 28 projects slightly beyond the bottom of the partition 5.

The operation of the magazine plate-holder is as follows: Assuming that plates 32 and 33, which are in the receiving-compartment 3, (see Fig. 2,) have been already exposed and have been thereafter removed from loading-compartment 4 and assuming that plates 34, 35, and 36 still remain in compartment 4, suppose now that plate 34 has been exposed and it is desired to substitute for it the exposed plate 35. The frame 16 is grasped by the hand and drawn quickly outward, thereby shifting the plate 34 from the loading-compartment 4 into the receiving-compartment 3. As the plate moves from compartment 4 it strikes the lower end of plate 28, which yields and permits the plate 34 to pass, the plate 28 turning on its trunnions 29 and 30 and compressing the spring 31. It will be seen by referring to Fig. 2 that the plate 33 by resting upon the flanges 21 and 22 is held above the path of movement of the plate 34 and that plate 34 moves under the plate 33 before the flanges 21 and 22 are withdrawn. As the end rail 18 of the shifting-frame 16 moves across the compartment 4 the plates 35 and 36 are pressed forward by the follower behind them; but even in its outermost position the end rail 18 of the shifting-frame 16 will remain partly within the compartment 4, so that the inclined portions 25 and 26 will rest beneath the plate 35, as shown in Fig. 3. In Fig. 3 the frame 16 is shown in the position which it occupies after it has moved a slight distance on its return movement. As the frame 16 moves back, the inclined fingers 23 and 24 or the plate-pusher moves under the stack of plates in the near compartment 3, and as the frame moves further inward this stack of exposed plates is lifted up onto the flanges 21 and 22. When the frame 16 reaches its innermost position, the end rail 18 enters the recess 27, and the plates 35 and 36 move forward, so that the plate 35 is within the frame occupying the same position as the plate 34 in Fig. 2. The plate 28 at its lower end engages the plate 34 as the shifting-frame moves inward and acts as a stop to prevent the displacement of the plate 34. Thus the plates may be shifted from one compartment to another by a swift movement of the shifting device or frame 16, thereby enabling the operator to make a number of exposures in rapid succession.

If desired, we may use the magazine plate-holder in a slightly-different manner—that is to say, we may fill the compartment 3 with unexposed plates and shift them, as required, into the compartment 4, to be there exposed. In this arrangement after each exposure the shifting frame or device would be pulled outward to engage an unexposed plate in the compartment 3 to shift it in front of the previously-exposed plate in the compartment 4. This arrangement would only require a shifting device slightly modified.

What we claim as new, and desire to secure by Letters Patent, is—

1. A magazine photographic plate-holder comprising a case having loading and receiving compartments each adapted to hold a stack of plates, and a plate-shifter for transferring the plates one by one from the loading-compartment to the receiving-compartment, said plate-shifter comprising a slide extending across both compartments in its innermost position and having an opening to receive the end plate in the loading-compartment and inclined lifting-surfaces for moving back the stack of plates in the receiving-compartment on the inward movement of the slide, substantially as described.

2. In a magazine photographic plate-holder, the combination with a case having two plate-holding compartments, of a slide for transferring the plates one by one from one compartment to the other, said slide extending across both compartments in its innermost position and having an opening to receive the end plate in one compartment and inclined lifting-surfaces for moving back the stack of plates in the other compartment on the inward movement of the slide, and a yielding stop arranged between the compartments and adapted to permit the passage of the plates in but one direction, substantially as described.

In testimony whereof we have signed our names to this specification in the presence of two subscribing witnesses.

ELIJAH B. CORE.
     LEO GRUBMAN.

Witnesses:
 EDWIN SEGER,
 NICHOLAS M. GOODLETT, Jr.